(12) United States Patent
Mok et al.

(10) Patent No.: US 7,375,992 B2
(45) Date of Patent: May 20, 2008

(54) SWITCHED-CAPACITOR REGULATORS

(75) Inventors: Kwok Tai Philip Mok, Kowloon (HK); Hoi Lee, Quarry Bay (HK)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 11/338,623

(22) Filed: Jan. 24, 2006

(65) Prior Publication Data

US 2006/0215428 A1  Sep. 28, 2006

Related U.S. Application Data

(60) Provisional application No. 60/645,966, filed on Jan. 24, 2005.

(51) Int. Cl.
*H02M 7/00* (2006.01)
(52) U.S. Cl. .................................. 363/60; 363/266
(58) Field of Classification Search ................ 363/60; 327/535, 536; 323/266; 307/109, 110
See application file for complete search history.

(56) References Cited

U.S. PATENT DOCUMENTS

| | | | |
|---|---|---|---|
| 4,733,159 A | 3/1988 | Edwards et al. | 323/282 |
| 5,680,300 A | 10/1997 | Szepesi et al. | 363/59 |
| 6,169,444 B1 | 1/2001 | Thurber, Jr. | 327/536 |
| 6,188,590 B1 | 2/2001 | Chang et al. | 363/60 |
| 6,300,820 B1 | 10/2001 | Fotouhi et al. | 327/536 |
| 6,392,904 B1 | 5/2002 | Bayer et al. | 363/59 |
| 6,411,531 B1 | 6/2002 | Nork et al. | 363/60 |
| 6,445,623 B1 | 9/2002 | Zhang et al. | 365/189.11 |
| 6,556,067 B2 | 4/2003 | Henry | 327/536 |
| 6,618,296 B2 | 9/2003 | Zhang | 365/189.09 |
| 6,642,774 B1 | 11/2003 | Li | 327/536 |

(Continued)

OTHER PUBLICATIONS

Chen et al., "*Switched-capacitor power converters with integrated low-dropout regulators*", IEEE International Symposium on Circuits and Systems, Sydney, Australia, vol. III pp. 293-296, 2001.

(Continued)

*Primary Examiner*—Jessica Han
(74) *Attorney, Agent, or Firm*—Schwabe, Williamson & Wyatt, P.C.

(57) ABSTRACT

A switched-capacitor regulator is provided for regulating the output voltage of a voltage supply. The switched-capacitor regulator includes a supply input terminal capable of receiving a supply voltage, two or more flying capacitors, a regulation switch located between each flying capacitor and the supply input terminal, and a voltage control circuit. The activity of the regulation switches is controlled by the voltage control circuit. In one embodiment of the invention, the voltage control circuit includes a feedback resistance area having one or more feedback resistors located between the output of the flying capacitors and a ground terminal, a first gain stage connected to the feedback resistance area, and two or more second switchable gain stages, which are each connected to a regulation switch and the first gain stage. The switched-capacitor regulator operates in pseudo-continuous regulator mode using three-stage switchable operational amplifiers with time-multiplexed pole-splitting compensation.

36 Claims, 13 Drawing Sheets

U.S. PATENT DOCUMENTS 6,661,683 B2    12/2003  Botker et al. .................. 363/60
6,717,458 B1     4/2004  Potanin ....................... 327/536
6,856,525 B2 *   2/2005  Wallis ......................... 363/59
6,937,487 B1 *   8/2005  Bron ........................... 363/60

OTHER PUBLICATIONS

Lee et al., *"Switching Noise Reduction Techniques for Switched-Capacitor Voltage Doubler,"* Proceedings of the IEEE 2003 Custom Integrated Circuits Conference, pp. 693-696, 2003.

* cited by examiner $V_o(1)$ @ light-load condition $V_o(2)$ @ medium-load condition $V_o(3)$ @ heavy-load condition

SWITCHED-CAPACITOR REGULATORS

CROSS-REFERENCE TO RELATED APPLICATIONS

This application claims priority from U.S. Provisional Application No. 60/645,966, filed Jan. 24, 2005, entitled AN AREA-EFFICIENT AND HIGH-ACCURACY SWITCHED-CAPACITOR REGULATOR. This Provisional Application is hereby incorporated herein by reference in its entirety.

FIELD OF THE INVENTION

The invention relates to switched-capacitor regulators, and in particular to switched-capacitor regulators with pseudo-continuous output regulation using a three-stage switchable operational amplifier and time-multiplexed pole-splitting compensation techniques. The invention is useful for decreasing chip area and improving the accuracy of output voltage.

BACKGROUND OF THE INVENTION

Switched-capacitor regulators are needed in many portable electronic devices to provide supply voltages for different systems. Possible devices include personal digital assistants, notebook computers and mobile phones.

The importance of switched-capacitor regulators is demonstrated by their capability to provide dc-to-dc conversions without the use of inductors. Less conducted electromagnetic interference and cross couplings are then generated to other systems, since no magnetic components are used. Existing control methods adopted in switched-capacitor regulators require extra power transistors or auxiliary circuits to regulate the output voltage. These increase the chip area of the thereby increasing the manufacturing cost.

The accuracy of the output voltage is critical to switched-capacitor regulators. The accuracy is determined by line and load regulations and the load-transient recovery time of regulators, which in turn is dependent on the implementation of the controller. Existing implementations employ single-stage linear amplifier in the controller, which can affect the accuracy of the regulators.

A number of methods have been employed to maintain the output voltage of a switched-capacitor regulator. Both U.S. Pat. No. 6,445,623 and U.S. Pat. No. 6,411,531 disclose two single-ended switched-capacitor regulators and are illustrated in FIGS. 1 and 2 respectively. Additional circuitry (either a current source or a variable resistor connected between the input supply voltage and switches S1, S2, S3 and S4) is required to maintain the output voltage. However, the additional circuitry is implemented by power transistors; thereby increasing the chip area and manufacturing cost.

Similarly, U.S. Pat. No. 6,411,531 also describes a single-ended switched-capacitor regulator as shown in FIG. 3, which uses an extra current source connected between the power switches and ground for output-voltage regulation. Therefore, the area efficiency of the switched-capacitor regulator is not ideal FIG. 4 shows a cross-coupled switched-capacitor regulator from U.S. Pat. No. 6,618,296. The cross-coupled design is similar to the configuration in U.S. Pat. No. 6,445,623, used to achieve dual phase operation. Extra power transistors are still required for regulating the output voltage, and this lowers the area efficiency of the regulator.

FIG. 5 shows a cross-coupled switched-capacitor regulator which maintains the output voltage without using extra power transistor, as described in W. Chen, W. H. Ki, P. K. T. Mok and M. Chan, "*Switched-capacitor power converters with integrated low-dropout regulators*", IEEE *International Symposium on Circuits and Systems*, Sydney, Australia, Vol. III, pp. 293-296, 2001. Power transistors Ml4 and Mr4 are alternately turned off during the capacitor charging phase and regulate the output voltage of the control loop during the capacitor discharging phase. Therefore, Ml4 and Mr4 function as switching low-dropout regulators (SLDR) and the control scheme is known as an SLDR mechanism. By adopting SLDR control, an analog buffer should be used in order to enable Ml4 and Mr4 to operate in the saturation region during capacitor discharge phase. However, extra auxiliary voltage doubler are required to generate a high-voltage clock signal swinging up to $2V_{DD}$ so as to drive extra switches connected to the output of the analog buffer. Extra auxiliary voltage doublers increase both the area and total static current dissipation in the controller. In addition, since the gate-voltage swing of Ml4 and Mr4 is $2V_{DD}$ and increases with the input supply voltage, the SLDR control causes switching noise problems in the switched capacitor regulator. Moreover, gain stage and analog buffer in the controller cascaded with power transistors Ml4 and Mr4 results in a two-stage switchable opamp. Two-stage switchable opamps may not provide sufficient loop gain magnitude, and hence the accuracy of the switched capacitor regulator is not optimized.

There is a need for a control method for a switched-capacitor regulator that is able to efficiently and accurately regulate the supply voltage of electronic devices without requiring additional power transistors or auxiliary circuits.

SUMMARY OF THE INVENTION

Usually an additional power transistor is required to regulate the output voltage of a switched-capacitor regulator. By means of the present invention, a switched-capacitor regulator operates in pseudo-continuous regulator mode using three-stage switchable opamps with time-multiplexed pole-splitting compensation technique. The regulator controls the output voltage continuously during every capacitor-discharging phase without adding extra power transistor nor requiring high-voltage clock signals; thereby enhancing area efficiency. In addition, the use of three-stage switchable opamps increases loop-gain magnitude and improves line and load regulations by alternate switching of gain stage in different clock phases. The time-multiplexed pole-splitting compensation technique in the switchable opamp not only ensures stability but also reduces load-transient recovery time.

The switched-capacitor regulator according to the present invention decreases chip area and results in a comparatively low output ripple at low switching frequencies; which can improve the accuracy of the resulting output voltage.

The switched-capacitor regulator according to the invention is of particular advantage if applied in an electronic appliance, such as, but not limited to, a portable electronic device.

The present invention provides, in a first aspect, a switched capacitor regulator for regulating output voltage. The switched capacitor regulator comprises a supply input terminal capable of receiving a supply voltage, and two or more flying capacitors, with a regulation transistor located between each flying capacitor and the supply input terminal. The switched capacitor regulator further comprises a voltage control circuit, the activity of the regulation transistors being controlled by the voltage control circuit. The regulation transistors function as variable resistors, and an output of the two or more flying capacitors is used to adjust resistance of the regulation transistors.

The present invention provides, in a second aspect, a switched capacitor regulator for regulating output voltage. The switched capacitor regulator comprises a supply input terminal capable of receiving a supply voltage, and two or more flying capacitors, with a regulation transistor located between each flying capacitor and the supply input terminal. The switched capacitor regulator further comprises a voltage control circuit comprising a feedback resistance area comprising one or more feedback resistors located between the output of the flying capacitors and a ground terminal, a first gain stage connected to the feedback resistance area, and two or more second switchable gain stages, each connected to a regulation transistor and the first gain stage. The activity of the regulation transistors is controlled by the voltage control circuit, the regulation transistors functioning as variable resistors, and an output of the two or more flying capacitors is used to adjust resistance of the regulation transistors.

The present invention provides, in a third aspect, a switched-capacitor regulator configured for providing a regulated output voltage. The switched-capacitor regulator comprises a supply input terminal for receiving a supply voltage, and a voltage control circuit configured for regulation of the output voltage. The switched-capacitor regulator further comprises two flying capacitors, each of the flying capacitors charging and discharging alternately in every half-clock period, two regulation transistors, each of the regulation transistors coupled between the supply input terminal and one terminal of a flying capacitor, and controlled by the voltage control circuit. The switched-capacitor regulator further comprises an output load circuit comprising a load capacitor and a load device, the output load circuit configured for maintaining a voltage charge on the load device, and two feedback resistors connected in series, coupled between the output of the switched-capacitor regulator and ground terminal. The discharging phase occurs when one flying capacitor is coupled between regulation transistor and the output load circuit, and the charging phase occurs when the flying capacitor is disconnected from the output load circuit and is charged by the supply input terminal. The regulation transistors function as variable resistors, and an output of the two flying capacitors is used to adjust resistance of the regulation transistors.

The invention may also broadly be said to consist in any alternative combination of features as described or shown in the accompanying drawings. Known equivalents of these features not expressly set out are nevertheless deemed to be included.

BRIEF DESCRIPTION OF THE DRAWINGS

The above-mentioned objects and some embodiments of the present invention can be more clearly understood from the following detailed description considered in conjunction with the following drawings, in which.

DETAILED DESCRIPTION OF THE INVENTION

Figure 1:
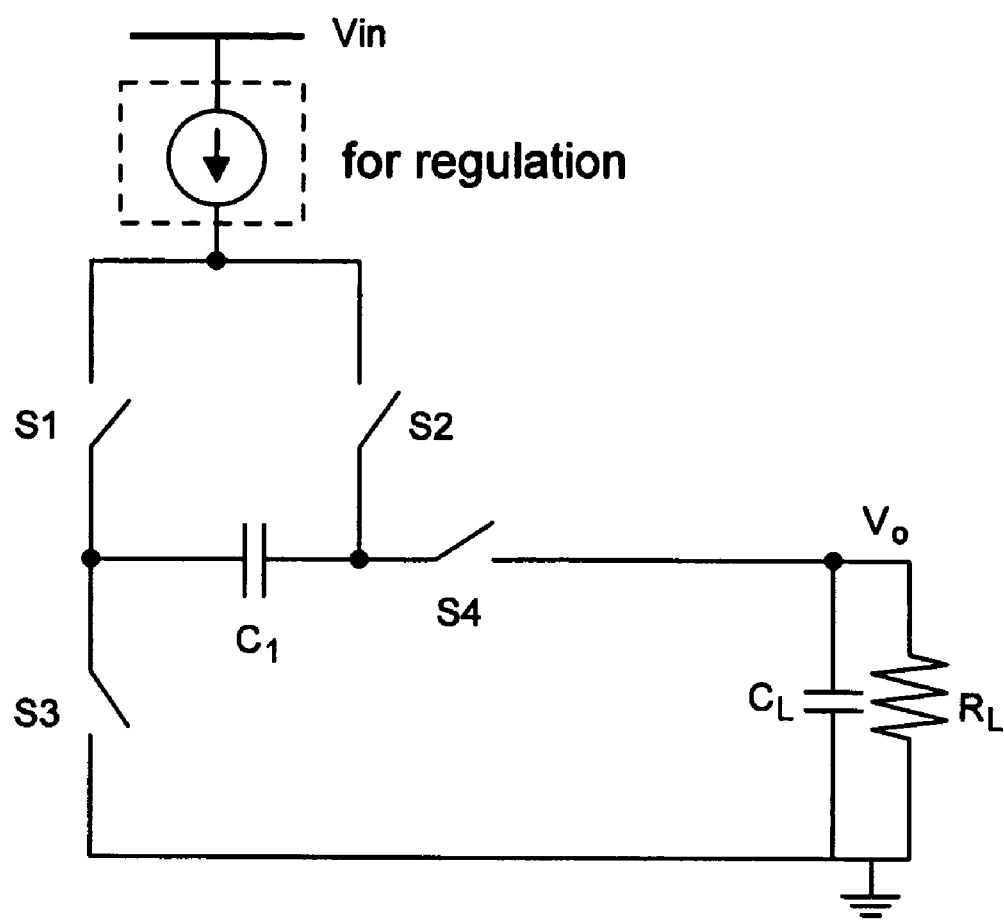
FIG. 1 is a schematic diagram of a known single-ended charge pump circuit.
Figure 2:
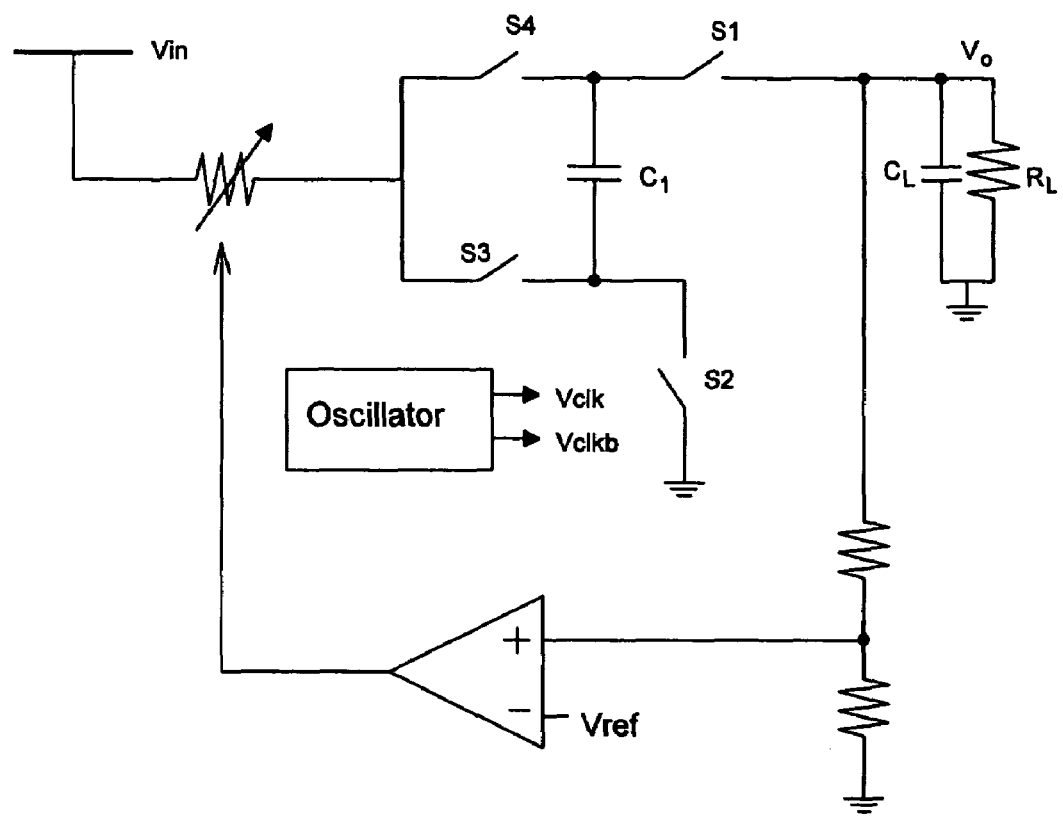
FIG. 2 is a schematic diagram of a known charge pump dc/dc converter.
Figure 3:
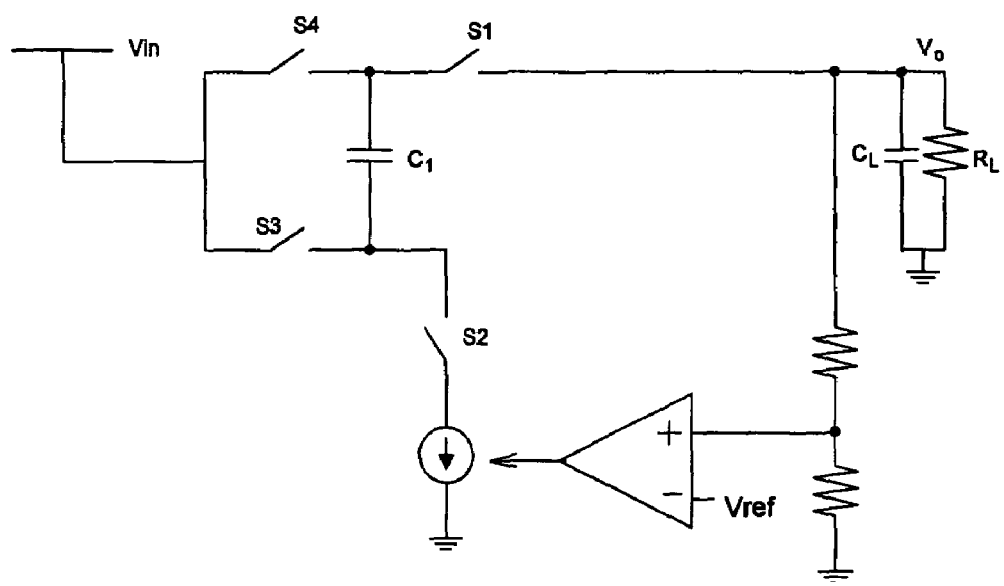
FIG. 3 is a schematic diagram of a known charge pump regulator.
Figure 4:
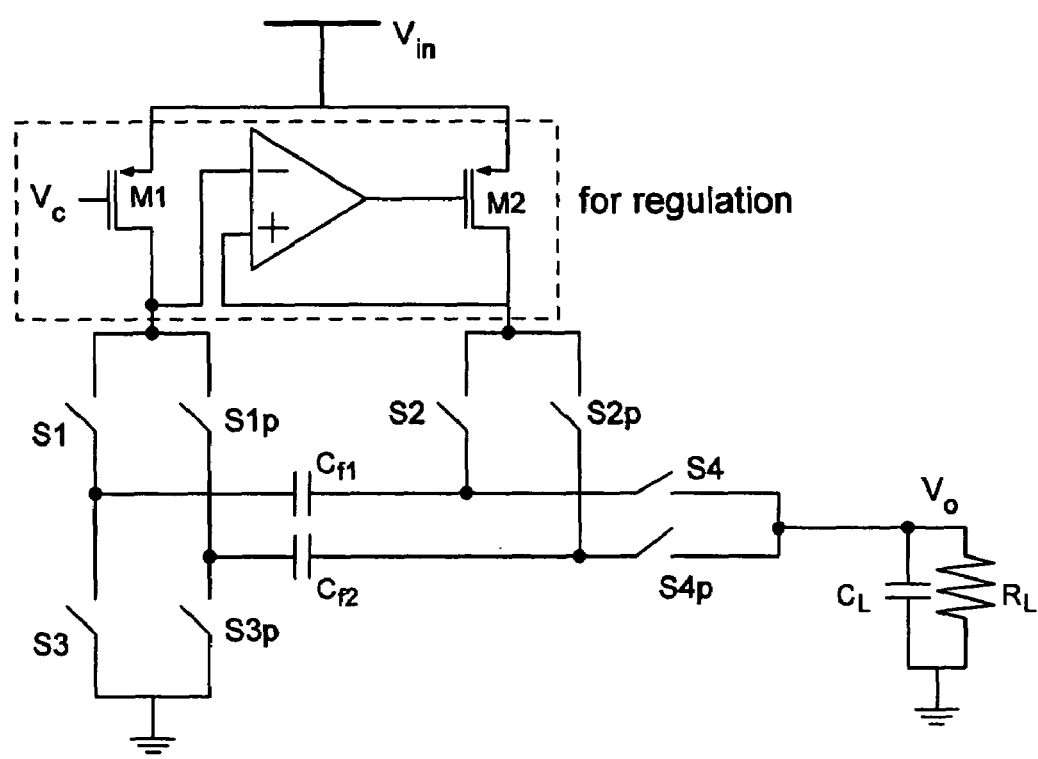
FIG. 4 is a schematic diagram of a known cross-coupled charge pump.
Figure 5:
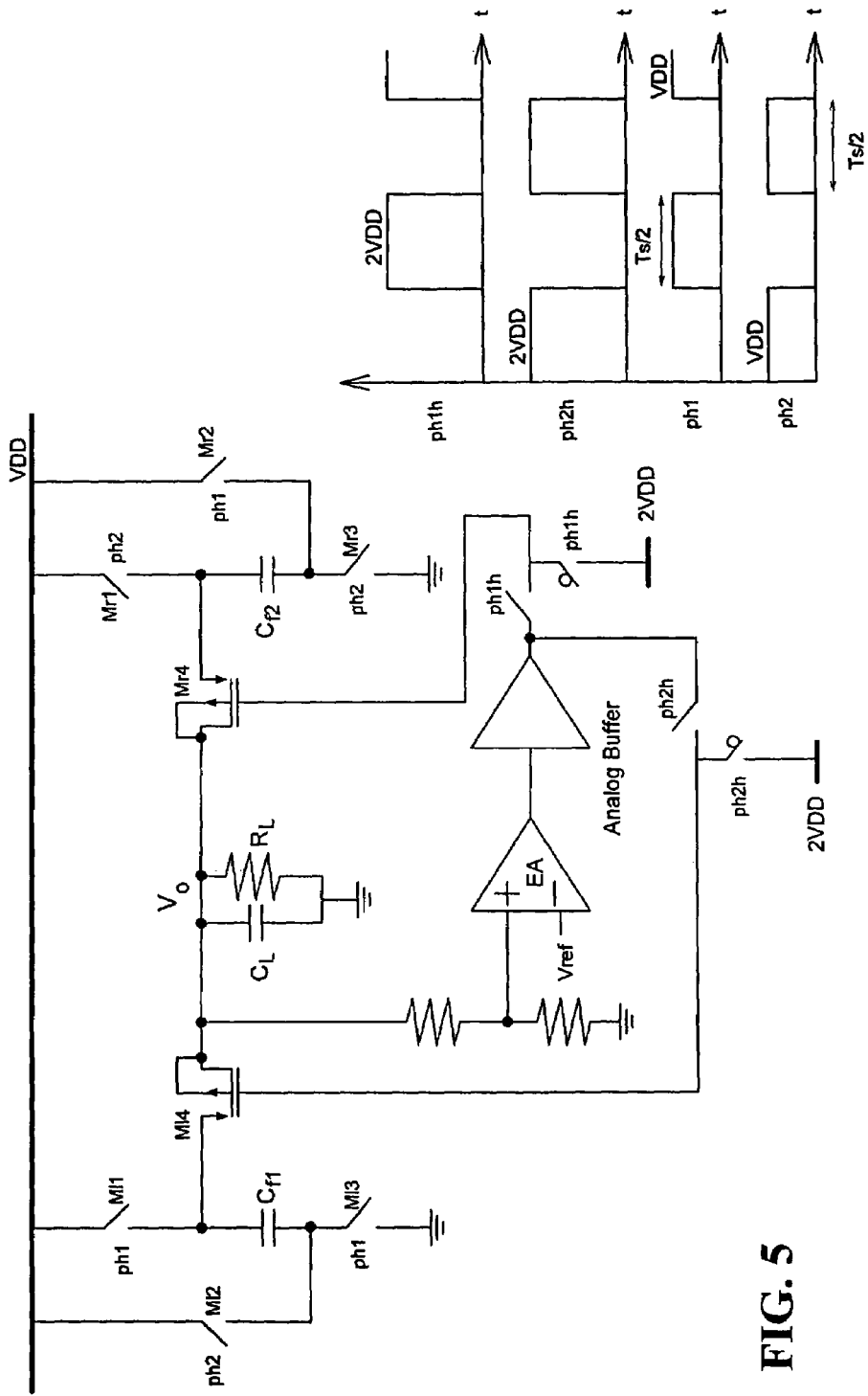
FIG. 5 is a schematic diagram of a known voltage doubler with switching low-dropout regulator.
Figure 6:
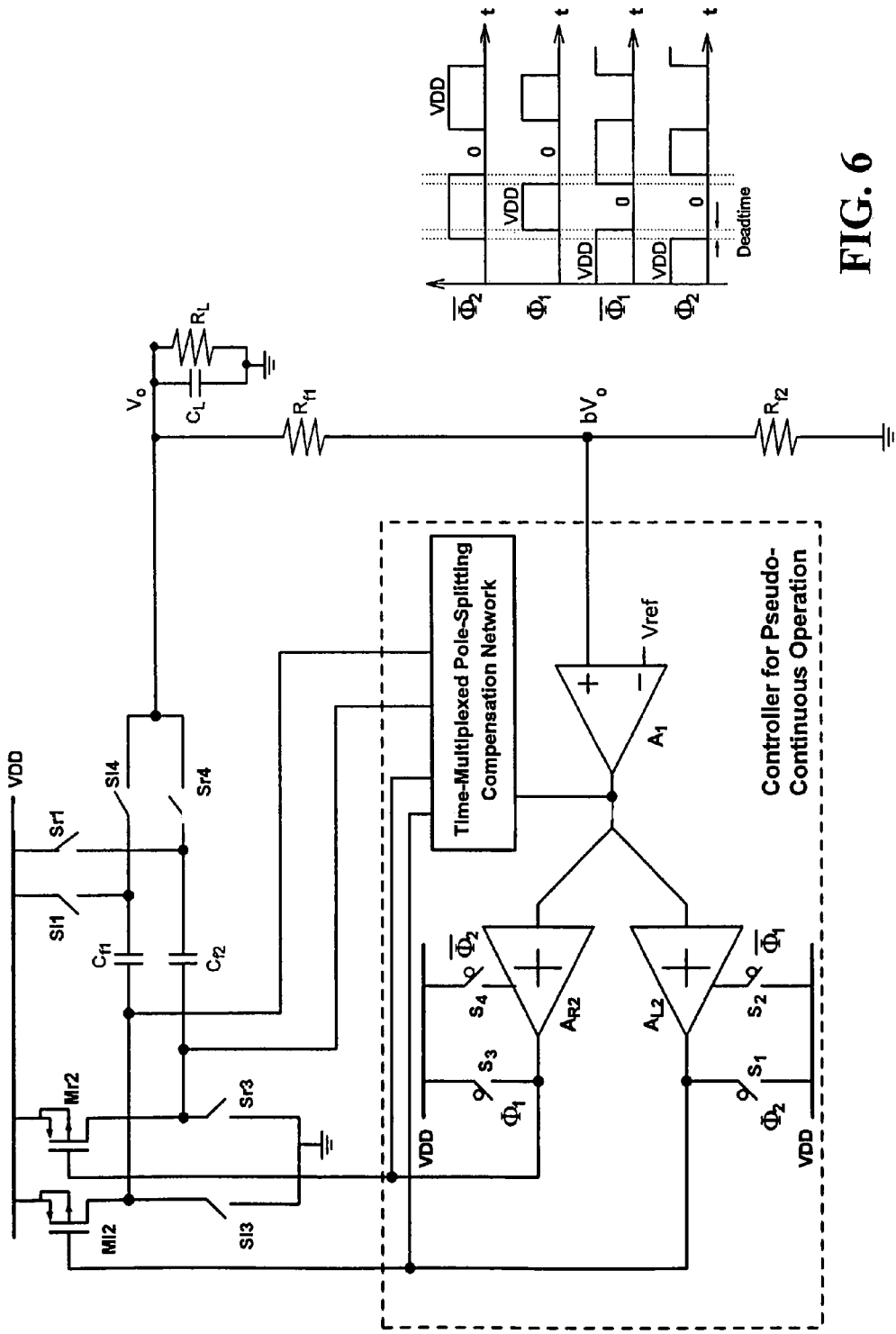
FIG. 6 is a schematic diagram of a boost switched-capacitor regulator according to an embodiment of the present invention.
Figure 7:
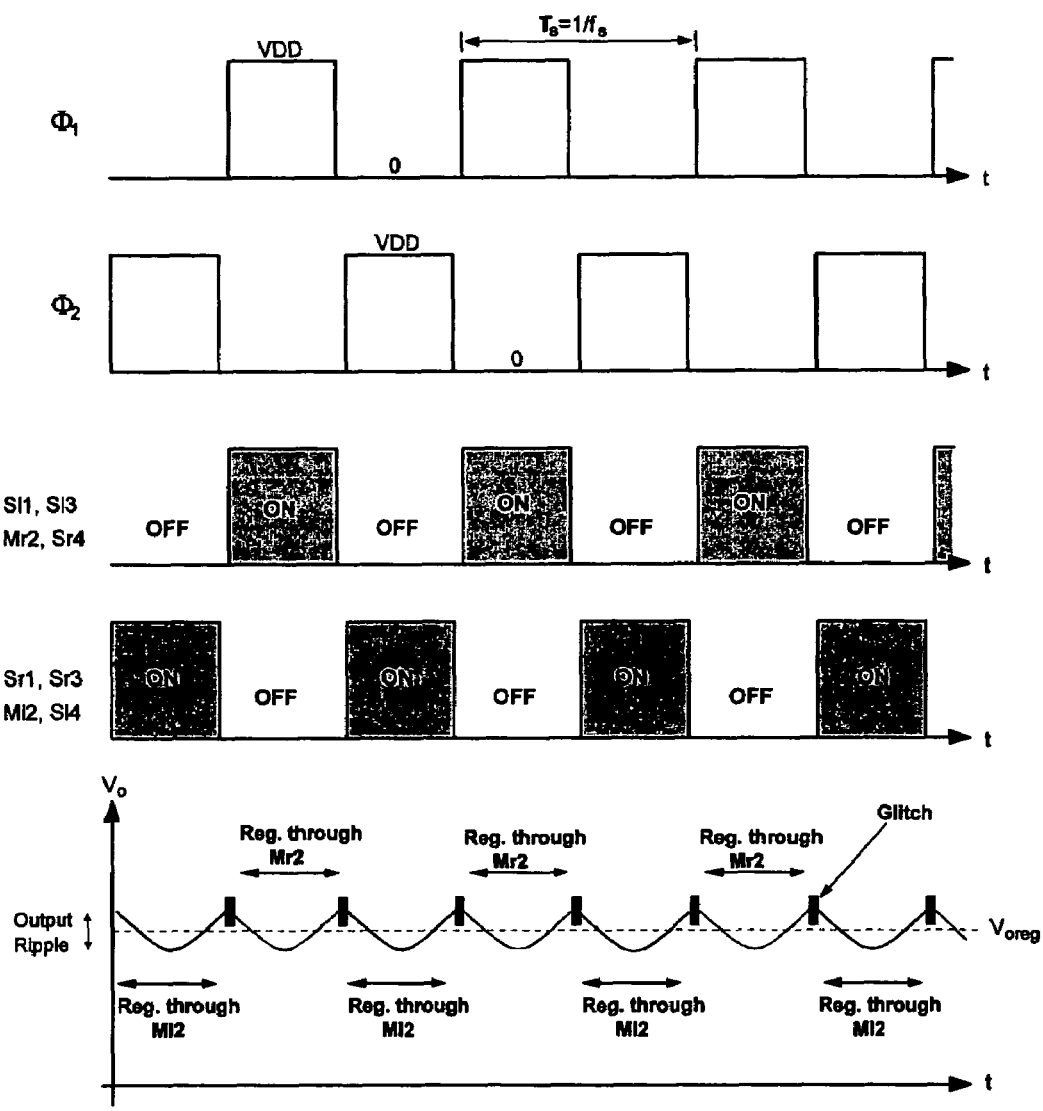
FIG. 7 is a timing diagram of a boost switched-capacitor regulator of the embodiment of FIG. 6.

The present invention is based on the concept of pseudo-continuous control switched-capacitor regulator. FIG. 6 shows an embodiment of the structure of the regulated cross-coupled voltage doubler with pseudo-continuous control. In the cross-coupled power stage, there are eight power transistors Ml1-Ml4 and Mr1-Mr4, and two flying capacitors $C_{f1}$ and $C_{f2}$ for voltage conversion. The additional circuitries Mal, Mar, Ral and Rar are used to reduce both the shoot-through current and switching noise of the converter, while the increase in area due to the additional circuitries is insignificant, as disclosed in H. Lee and P. K. T. Mok, "*Switching Noise Reduction Techniques for Switched-Capacitor Voltage Doubler,*" *Proceedings of the IEEE* 2003 *Custom Integrated Circuits Conference*, pp. 693-696, 2003. With pseudo-continuous control, both Ml2 and Mr2 operate as regulation transistors (also referred to as regulation switches), while other power transistors function as switches, therefore no additional power transistors are needed to continuously regulate the output. The converter according to the present invention is thus more area efficient than previous models. In preferred embodiments, the regulation switches are bipolar transistors or MOSFET transistors. The regulation switches may also function as variable resistors or gain stages. The principle of operation can best be described with reference to the timing diagram in FIG. 7. The control mechanism operates in non-overlapping clock phases $\Phi_1$ and $\Phi_2$ alternately. When $\Phi_2=V_{DD}$, both power transistors Mr2, Mr4 are off and Mr1, Mr3 are on, so the voltage across $C_{f2}$ is increased to $\sim V_{DD}$ in the charging phase. At the same time, Ml2 and Ml4 are on and $C_{f1}$ is in the discharging phase. Since both switches $S_{L1}$ and $S_{L2}$ are off, an appropriate dropout voltage ($V_{DO}$) is regulated across Ml2 by gain stages $A_1$ and $A_{L2}$ in the controller. The dropout voltage stacks on $V_{DD}$ that is stored in $C_{f1}$ in the previous half-clock period to provide the desired regulated output voltage $V_{oreg}$, where $V_{oreg} \approx V_{DO}+V_{DD}=(1+R_{f1}/R_{f2})V_{ref}$. In the next half-clock cycle of $\Phi_1=V_{DD}$, the operating phases $C_{f1}$ and $C_{f2}$ are swapped, so $V_{oreg}$ is maintained by regulating Mr2 using gain stages $A_1$ and $A_{R2}$. The above actions repeat in every clock period, so continuous-output regulation is achieved as illustrated by the waveform of $V_o$. Since both power transistors Ml2 and Mr2 are regulated alternately corresponding to the discharging phase of $C_{f1}$ and $C_{f2}$, respectively, the proposed mechanism operates at pseudo-continuous mode. This pseudo-continuous control can also be used in other types of switched-capacitor dc-dc converters with different cross-coupled power stages.

Figure 8:
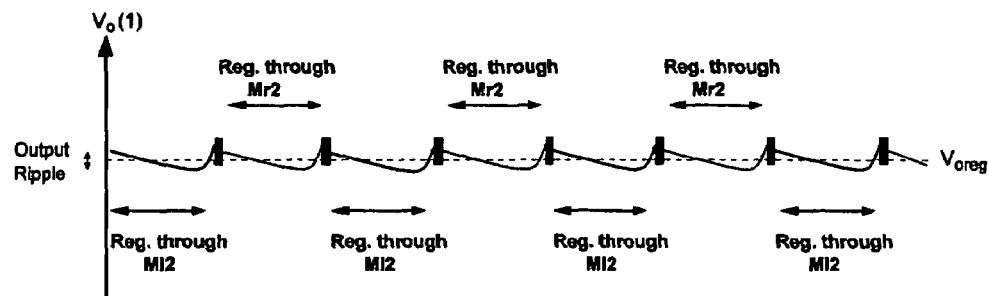
FIG. 8 is output ripple waveforms of a boost switched-capacitor regulator of the embodiment of FIG. 6.
Figure 8:
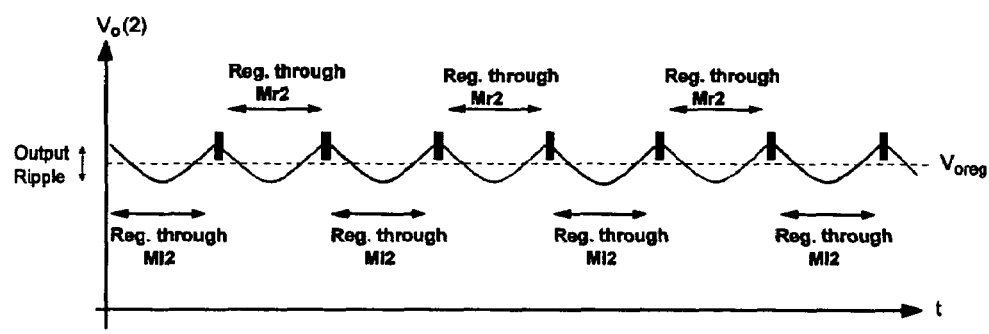
Figure 8:
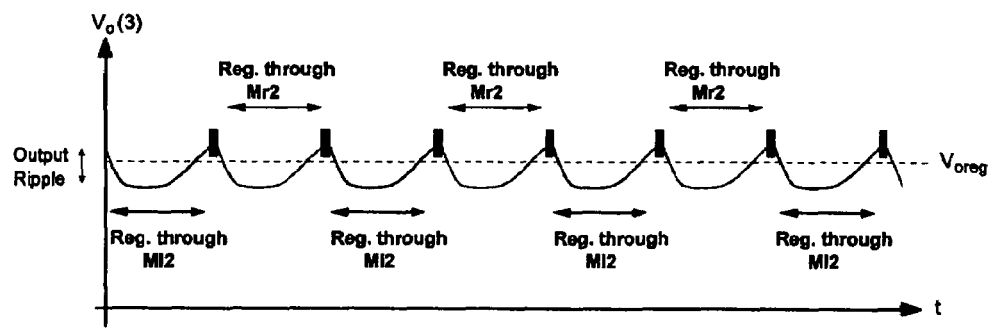

$V_o(1)$ and $V_o(2)$ in FIG. 8 illustrate the output ripple in different load currents. Initially, the ripple increases with the load current. Due to continuous-output regulation, when the ripple amplitude reaches the limit defined by the load regulation, it stays constant with respect to the load-current change. Both upper and lower limits of the output are maintained at particular levels by varying $V_{DO}$. Low ripple can thus be attained, provided that the converter has a large low-frequency loop-gain magnitude. Moreover, the load-transient response of the a pseudo-continuous control converter is independent of a wide range of switching frequencies. The converter can achieve a fast load-transient response by widening the loop-gain bandwidth and high light-load power efficiency by using low switching frequency simultaneously.

To implement the pseudo-continuous control, gain stages in the controller cascaded with power transistors Ml2 and Mr2 result in a three-stage switchable opamp. The three-stage switchable opamp can increase the low-frequency loop-gain magnitude and improve the load regulation in low-voltage condition. Both switchable second gain stages regulate the output or turn off alternately in every half-clock period to save the static current dissipation in the controller.

Figure 9:
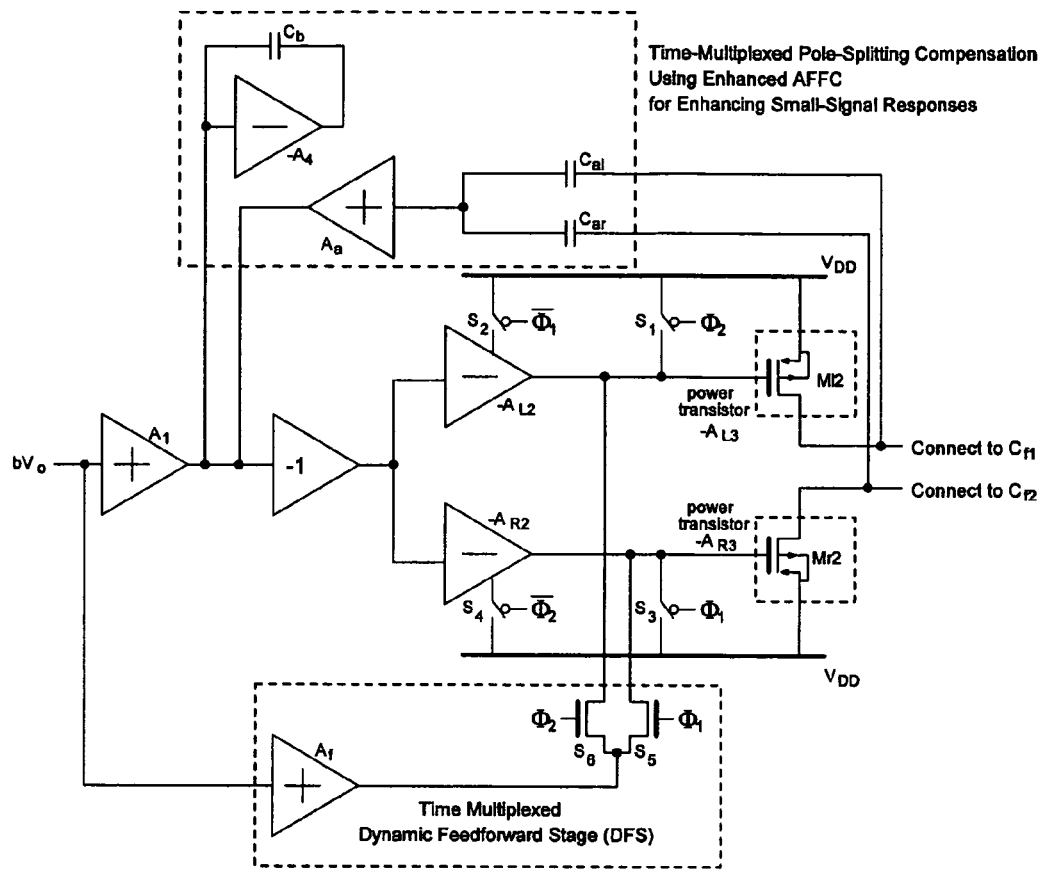
FIG. 9 is the schematic diagram of an exemplary embodiment of the present invention showing a three-stage switchable opamp with time-multiplexed pole-splitting compensation network for a boost switched-capacitor regulator of the embodiment of FIG. 6.

The stability and loop-gain bandwidth in low-power condition are determined by the frequency compensation of the three-stage switchable opamp. One implementation of the pseudo-continuous control switched-capacitor regulator of the embodiment of FIG. 6 is shown in FIG. 9. Time-multiplexed enhanced active-feedback frequency compensation is employed in the pseudo-continuous control converter. The enhanced active-feedback frequency compensation consists of a damping-factor-control block and time-multiplexed active-capacitive feedback networks. Two compensation capacitors $C_{al}$ and $C_{ar}$, with the positive gain stage $A_a$, establish an active-capacitive feedback network in every alternate half-clock period. The damping-factor-control block is located at the output of the first gain stage in order to eliminate the use of Miller capacitor. The enhanced active-feedback frequency compensation can increase the loop-gain bandwidth in low-power condition; thereby improving the load-transient response of the converter in low switching frequencies. The time-multiplexed dynamic feedforward stage generates extra dynamic current to the output of either second gain stages $A_{L2}$ or $A_{R2}$, according to clock signals $\Phi_1$ and $\Phi_2$ in order to realize a push-pull effect at the gates of power transistors Ml2 and Mr2. The push-pull effect relaxes the slew-rate limitation of driving Ml2 and Mr2 in low-power condition. As both Ml2 and Mr2 can be turned on and off much faster during switching, the load-transient response is further improved.

In preferred embodiments, the DC voltage gains of the first gain stage and the second switchable gain stages are greater than 1.

Figure 10A:
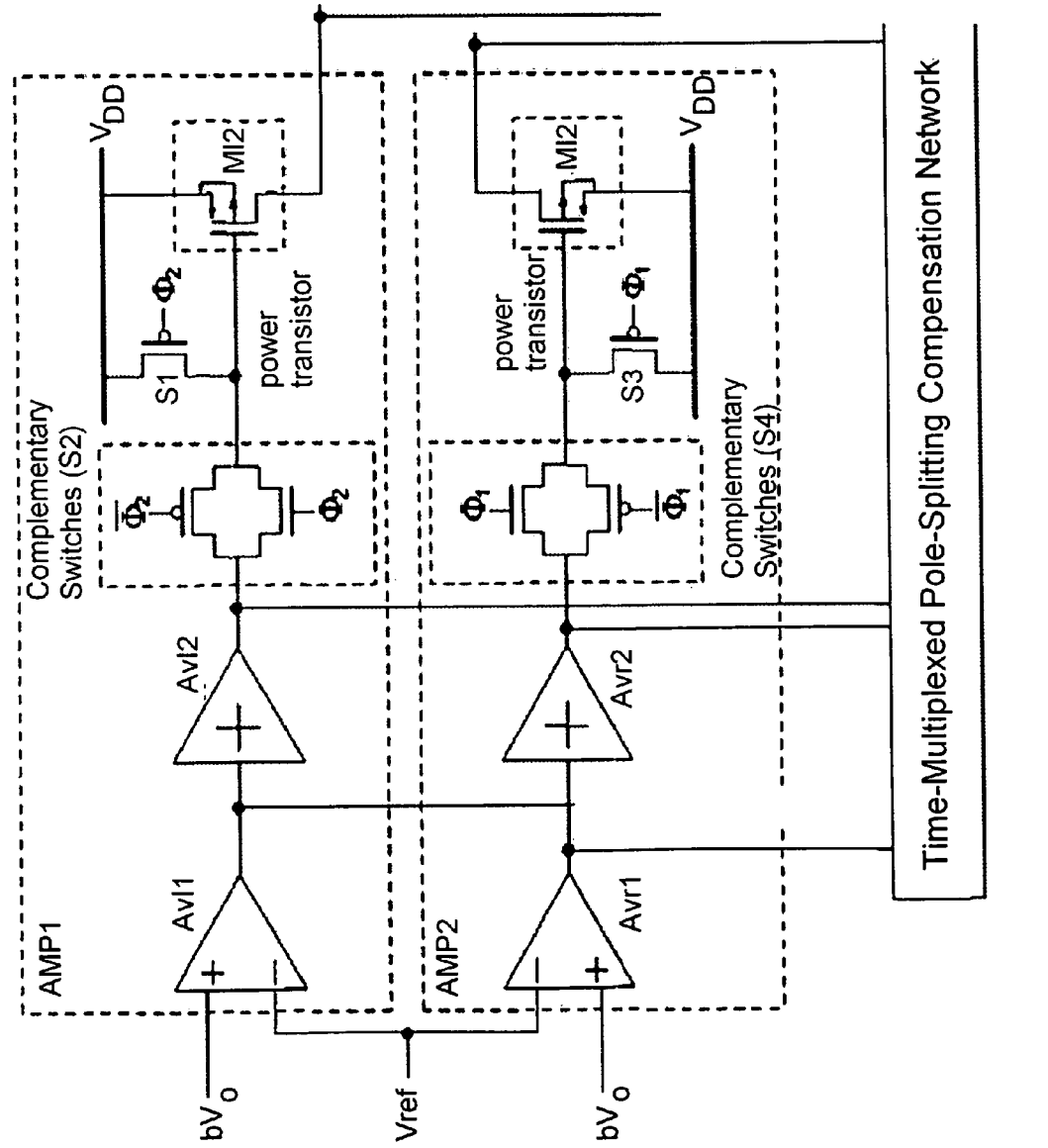
FIGS. 10(a) & (b) are the schematic diagrams of two exemplary embodiments of the present invention showing different three-stage switchable opamps with time-multiplexed pole-splitting compensation network for a boost switched-capacitor regulator of the embodiment of FIG. 6.
Figure 10B:
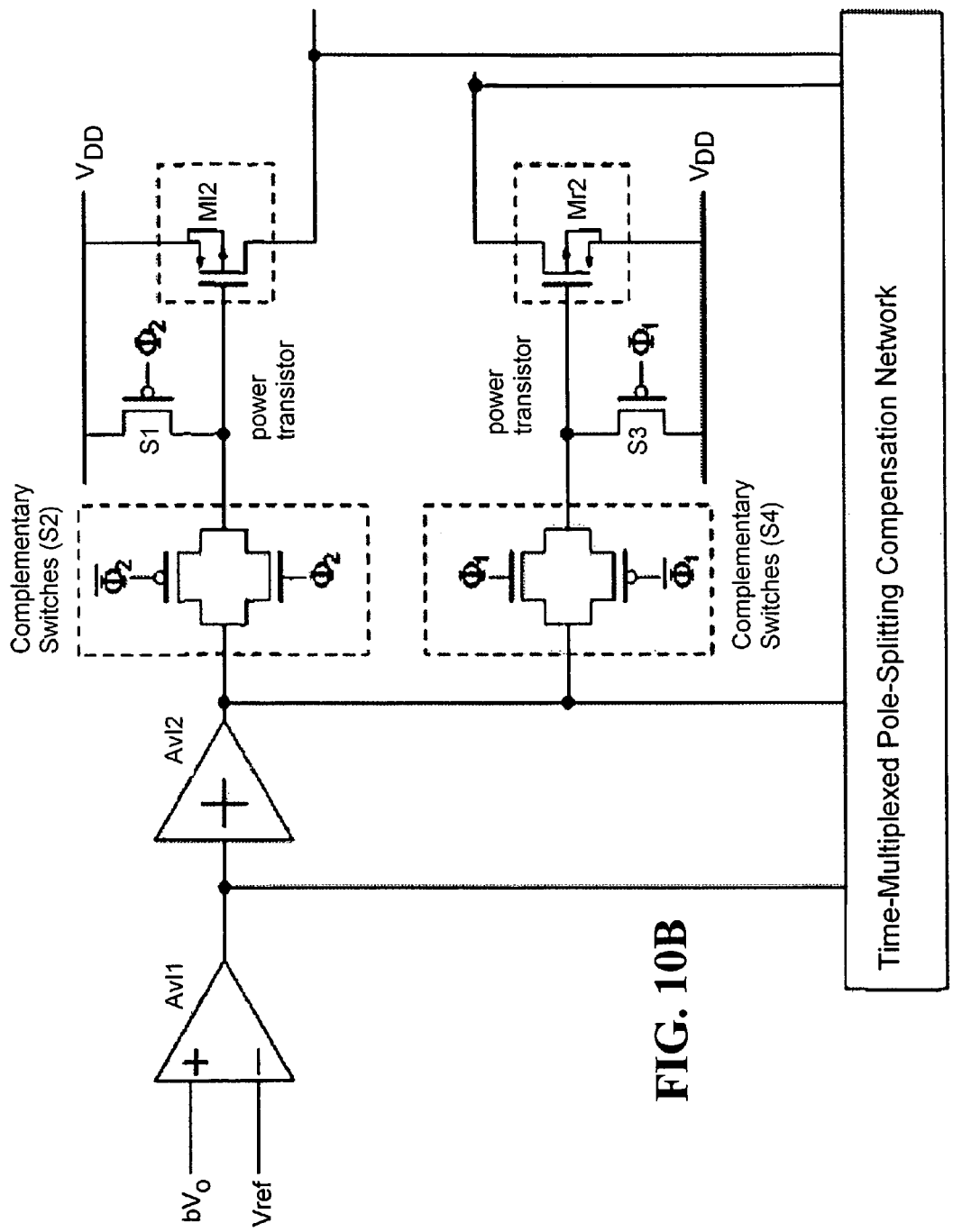

FIGS. 10(a) and 10(b) illustrate two alternative methods of implementing three-stage switchable opamps with time-multiplexed pole-splitting compensation network using serial complementary switches after second gain stages $A_{L2}$ and $A_{R2}$.

Figure 11:
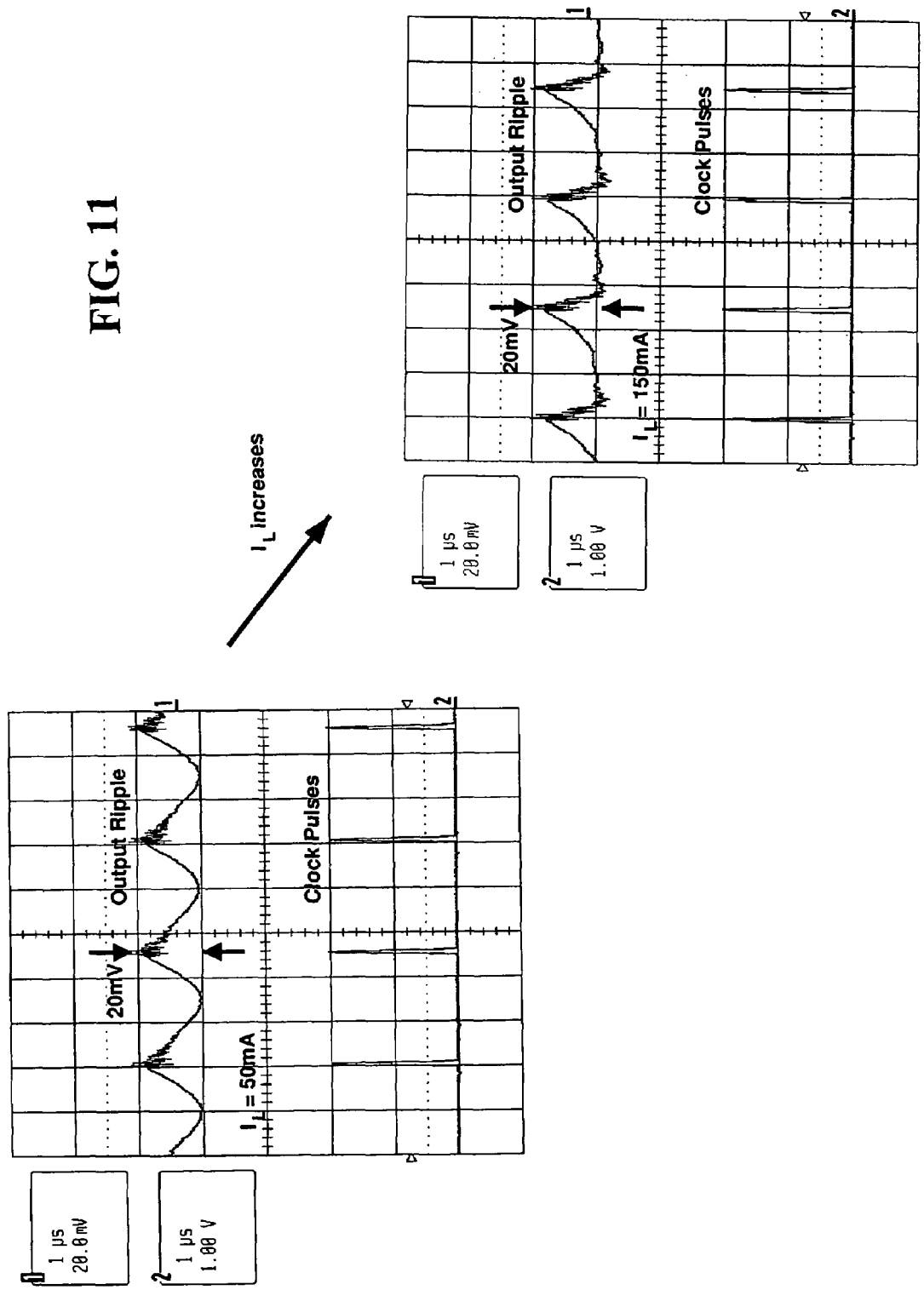
FIG. 11 is the measured output ripples of the embodiment of FIG. 6 in different load currents.
Figure 12:
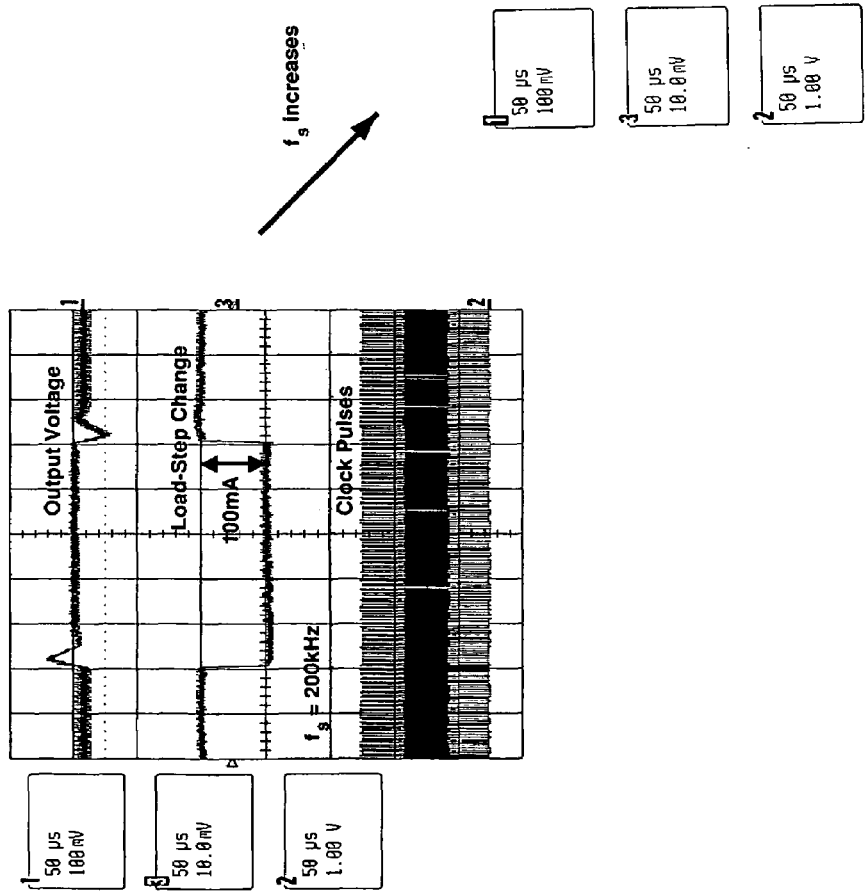
FIG. 12 is the measured transient output voltages of the embodiment of FIG. 6 in different switching frequencies.

The embodiment of FIG. 6 has been implemented by way of an example in a 0.6 μm CMOS n-well process. The maximum output voltage is regulated at $(2V_{in}-0.3)V$. FIG. 11 demonstrates that the output ripple is maintained at 20 mV when the load current increases from 50 mA to 150 mA. This justifies the continuous-output regulation provided by the proposed pseudo-continuous control. FIG. 12 shows that the same output load-transient recovery time of ~25 μs is achieved with a load change of 100 mA in 1 μs for the switching frequency varying from 200 kHz to 500 kHz. Fast load-transient response is thus realized across a wide range of switching frequencies by using the described three-stage switchable opamp.

The above describes some preferred embodiments of the present invention and indicates several possible modifications but it will be appreciated by those skilled in the art that other modifications can be made without departing from the scope of the invention.

The invention claimed is:

1. A switched capacitor regulator for regulating output voltage comprising:
   a supply input terminal capable of receiving a supply voltage;
   two or more flying capacitors, with a regulation transistor located between each flying capacitor and the supply input terminal; and
   a voltage control circuit;
   wherein the activity of the regulation transistors is controlled by the voltage control circuit, wherein the regulation transistors function as variable resistors, and wherein an output of the two or more flying capacitors is used to adjust resistance of the regulation transistors.

2. A switched capacitor regulator according to claim 1 comprising two flying capacitors and two regulation transistors.

3. A switched capacitor regulator according to claim 1 wherein the flying capacitors charge and discharge alternately.

4. A switched capacitor regulator according to claim 3 wherein the flying capacitors charge and discharge alternately every half-clock period.

5. A switched capacitor regulator according to claim 1 wherein the regulation transistors are bipolar transistors or MOSFET transistors.

6. A switched capacitor regulator according to claim 1 wherein the voltage control circuit comprises:
   a feedback resistance area comprising one or more feedback resistors located between the output of the flying capacitors and a ground terminal;
   a first gain stage connected to the feedback resistance area; and
   two or more second switchable gain stages, each connected to a regulation transistor and the first gain stage.

7. A switched capacitor regulator according to either of claims 1 or 6 wherein the regulation transistors function as variable resistors or gain stages.

8. A switched capacitor regulator according to claim 6 wherein the feedback resistance area comprises two feedback resistors.

9. A switched capacitor regulator according to claim 8 wherein the first gain stage is coupled between the two feedback resistors and the second switchable gain stages.

10. A switched capacitor regulator according to claim 6 further comprising at least one switch located between each second switchable gain stage and the supply input terminal.

11. A switched capacitor regulator according to claim 10 comprising a plurality of switches between each second switchable gain stage and the supply input terminal.

12. A switched capacitor regulator according to claim 11 wherein an auxiliary switch and a main switch are located between each second switchable gain stage and the supply input terminal.

13. A switched capacitor regulator according to claim 11 wherein the DC voltage gains of the first gain stage and the second switchable gain stages are greater than 1.

14. A switched capacitor regulator for regulating output voltage comprising:
a supply input terminal capable of receiving a supply voltage, and
two or more flying capacitors, with a regulation transistor located between each flying capacitor and the supply input terminal;
a voltage control circuit comprising a feedback resistance area comprising one or more feedback resistors located between the output of the flying capacitors and a ground terminal, a first gain stage connected to the feedback resistance area, and two or more second switchable gain stages, each connected to a regulation transistor and the first gain stage,
wherein the activity of the regulation transistors is controlled by the voltage control circuit, wherein the regulation transistors function as variable resistors, and wherein an output of the two or more flying capacitors is used to adjust resistance of the regulation transistors.

15. A switched-capacitor regulator configured for providing a regulated output voltage, said switched-capacitor regulator comprising:
a supply input terminal for receiving a supply voltage,
a voltage control circuit configured for regulation of said output voltage,
two flying capacitors, each of said flying capacitors charging and discharging alternately in every half-clock period,
two regulation transistors, each of said regulation transistors coupled between the supply input terminal and one terminal of a flying capacitor,
each of said regulation transistors controlled by the voltage control circuit,
an output load circuit comprising a load capacitor and a load device, said output load circuit configured for maintaining a voltage charge on said load device,
two feedback resistors connected in series, coupled between the output of said switched-capacitor regulator and ground terminal;
wherein the discharging phase occurs when one flying capacitor is coupled between regulation transistor and said output load circuit, and said charging phase occurs when said flying capacitor is disconnected from said output load circuit and is charged by said supply input terminal, wherein the regulation transistors function as variable resistors, and wherein an output of the two flying capacitors is used to adjust resistance of the regulation transistors.

16. A switched-capacitor regulator as claimed in claim 15, wherein said supply input terminal is between a positive supply voltage and a ground terminal.

17. A switched-capacitor regulator as claimed in claim 15, wherein said switched-capacitor regulator operates with a non-overlapping clock scheme.

18. A switched-capacitor regulator as claimed in claim 15, wherein said switched-capacitor regulator operates with an overlapping clock scheme.

19. A switched-capacitor regulator as claimed in claim 15, wherein said regulation transistors are bipolar transistors.

20. A switched-capacitor regulator as claimed in claim 15, wherein said regulation transistors are MOSFET transistors.

21. A switched-capacitor regulator as claimed in claim 15, wherein said regulation transistors function as gain stages.

22. A switched-capacitor regulator as claimed in claim 15, wherein one flying capacitor is in a charging phase while the other flying capacitor is in a discharging phase.

23. A switched-capacitor regulator as claimed in claim 15, wherein each of the regulation transistors is OFF in the charging phase, and is used for output regulation in the discharging phase.

24. A switched-capacitor regulator as claimed in claim 15, wherein the output voltage of the switched-capacitor regulator is maintained by the control circuit and a regulation transistor continuously during said discharging phase of each of the flying capacitors.

25. A switched-capacitor regulator as claimed in claim 15, wherein said control circuit comprises:
a first gain stage with its input connected at the connection point of the two feedback resistors;
two switchable gain stages, each switchable gain stage coupled between the output of said first gain stage and one of the regulation transistors at the corresponding output of said control circuit,
two auxiliary switches, each coupled between the supply input terminal and a switchable gain stage, and
two main switches, each main switch coupled between the supply input terminal and the output of the control circuit.

26. A switched-capacitor regulator as claimed in claim 25, wherein DC voltage gains of the first gain stage and the switchable gain stages are greater than 1.

27. A switched-capacitor regulator as claimed in claim 25, wherein said first gain stage always conducts.

28. A switched-capacitor regulator as claimed in claim 25, wherein each of the switchable gain stages conducts when its corresponding auxiliary switch is OFF, and each of the switchable gain stages is turned OFF when its corresponding said auxiliary switch is ON.

29. A switched-capacitor regulator as claimed in claim 25, wherein each of the regulation transistors conducts when its corresponding switchable gain stage is ON and both the corresponding auxiliary switch and main switch are OFF.

30. A switched-capacitor regulator as claimed in claim 25, wherein each of the regulation transistors is turned OFF when its corresponding switchable gain stage is OFF and either the corresponding auxiliary switch or the corresponding main switch is ON.

31. A switched-capacitor regulator as claimed in claim 25, wherein each of the regulation transistors is turned OFF when its corresponding switchable gain stage is OFF and both the corresponding auxiliary switch and the main switch are ON.

32. A switched-capacitor regulator as claimed in claim 25, wherein the two main switches and two auxiliary switches are MOSFET transistors.

33. A switched-capacitor regulator as claimed in claim 25, wherein when the flying capacitor at the output of the corresponding regulation transistor is in a discharging phase, both the auxiliary switch of the corresponding switchable gain stage and the main switch at the output of the control circuit are OFF, and the other switchable gain stage and its corresponding regulation transistor are OFF.

34. A switched-capacitor regulator as claimed in claim 25, wherein the operation of two sets of switchable gain stages and the regulation transistors is swapped in alternate clock periods.

35. A switched-capacitor regulator as claimed in claim 15, wherein the control circuit comprises:
- two first gain stages with their inputs connected between of said feedback resistors;
- two second gain stages, each second gain stage coupled between the output of a first gain stage and an auxiliary switch;
- two auxiliary switches, each auxiliary switch coupled between the output of a second gain stage and one regulation transistor at the corresponding output of said control circuit; and
- two main switches, each coupled between the supply input terminal and the output of the control circuit.

36. A switched-capacitor regulator as claimed in claim 15, wherein the control circuit comprises:
- a first gain stage having its input connected between the two feedback resistors;
- a second gain stage coupled between the output of a first gain stage and an auxiliary switch;
- two auxiliary switches, each coupled between the output of a second gain stage and one of regulation transistor at the output of control circuit; and
- two main switches, each coupled between the supply input terminal and the output of the control circuit.

* * * * *

UNITED STATES PATENT AND TRADEMARK OFFICE
CERTIFICATE OF CORRECTION

PATENT NO.         : 7,375,992 B2                                    Page 1 of 1
APPLICATION NO.    : 11/338623
DATED              : May 20, 2008
INVENTOR(S)        : Kwok Tai Philip Mok and Hoi Lee It is certified that error appears in the above-identified patent and that said Letters Patent is hereby corrected as shown below:

In the drawings, Sheet 10, Figure 10(A), the reference numeral "MI2" in AMP2 should be --Mr2--

Signed and Sealed this

Tenth Day of August, 2010

David J. Kappos
*Director of the United States Patent and Trademark Office*